United States Patent
Vaughan et al.

(10) Patent No.: US 9,777,812 B2
(45) Date of Patent: Oct. 3, 2017

(54) ACTUATOR INCLUDING HANDLING-PROOF POSITION FEEDBACK MECHANISM

(71) Applicant: HONEYWELL INTERNATIONAL INC., Morris Plains, NJ (US)

(72) Inventors: Ron Vaughan, Gilbert, AZ (US); Kevin K. Chakkera, Chandler, AZ (US); Paul T. Wingett, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/351,967

(22) Filed: Nov. 15, 2016

(65) Prior Publication Data

US 2017/0059020 A1 Mar. 2, 2017

Related U.S. Application Data

(62) Division of application No. 13/770,794, filed on Feb. 19, 2013, now Pat. No. 9,512,910.

(51) Int. Cl.
*F16H 3/06* (2006.01)
*F16H 27/02* (2006.01)
(Continued)

(52) U.S. Cl.
CPC ... *F16H 25/2204* (2013.01); *F16H 2025/204* (2013.01); *F16H 2025/2084* (2013.01); *F16H 2025/2093* (2013.01); *Y10T 74/18576* (2015.01)

(58) Field of Classification Search
CPC ............ F16H 25/20; F16H 25/2204; F16H 2025/204; F16H 2025/2093;
(Continued)

(56) References Cited

U.S. PATENT DOCUMENTS

| 4,030,137 A | * | 6/1977 | Dalziel | ............... | G11B 5/5521 |
| | | | | | 360/261.3 |
| 5,448,884 A | | 9/1995 | Repp | | |

(Continued)

FOREIGN PATENT DOCUMENTS

| EP | 2141113 A1 | 1/2010 |
| EP | 2249461 A1 | 11/2010 |

OTHER PUBLICATIONS

EP Examination Report for Application No. 14152746.5, Dated Jun. 24, 2014.
(Continued)

*Primary Examiner* — David M Fenstermacher
*Assistant Examiner* — Jake Cook
(74) *Attorney, Agent, or Firm* — Lorenz & Kopf, LLP

(57) ABSTRACT

An actuator includes a housing assembly, an actuator shaft, an actuation member, and an anti-rotation rod. The actuator shaft is rotationally mounted in the housing assembly, is adapted to receive a drive torque, and is configured, upon receipt of the drive torque, to rotate. The actuation member is mounted on the actuator shaft, and is configured to translate in response to rotation of the actuator shaft. The anti-rotation rod is coupled to the actuator housing and extends therefrom. The anti-rotation is rod configured to at least selectively engage, and thereby prevent rotation of, the actuation member.

10 Claims, 4 Drawing Sheets

(51) Int. Cl.
*F16H 29/02* (2006.01)
*F16H 29/20* (2006.01)
*F16H 25/22* (2006.01)
*F16H 25/20* (2006.01)

(58) Field of Classification Search
CPC ..... F16H 2025/2084; F16H 2025/2445; F16H 2025/2481
See application file for complete search history.

(56) References Cited

U.S. PATENT DOCUMENTS

| | | | |
|---|---|---|---|
| 6,408,706 B1 * | 6/2002 | Nagai | F16C 29/02 384/29 |
| 6,935,097 B2 | 8/2005 | Eschborn | |
| 2005/0011291 A1 | 1/2005 | Nagai et al. | |
| 2006/0102697 A1 | 5/2006 | Nagai | |
| 2009/0260463 A1 | 10/2009 | Fukano | |
| 2010/0083823 A1 | 4/2010 | Zeichner | |
| 2012/0186374 A1 | 7/2012 | Schroeder | |
| 2013/0019420 A1 | 1/2013 | Gronli | |

OTHER PUBLICATIONS

EP Search Report for Application No. 14152746.5, Dated Jun. 11, 2014.

* cited by examiner

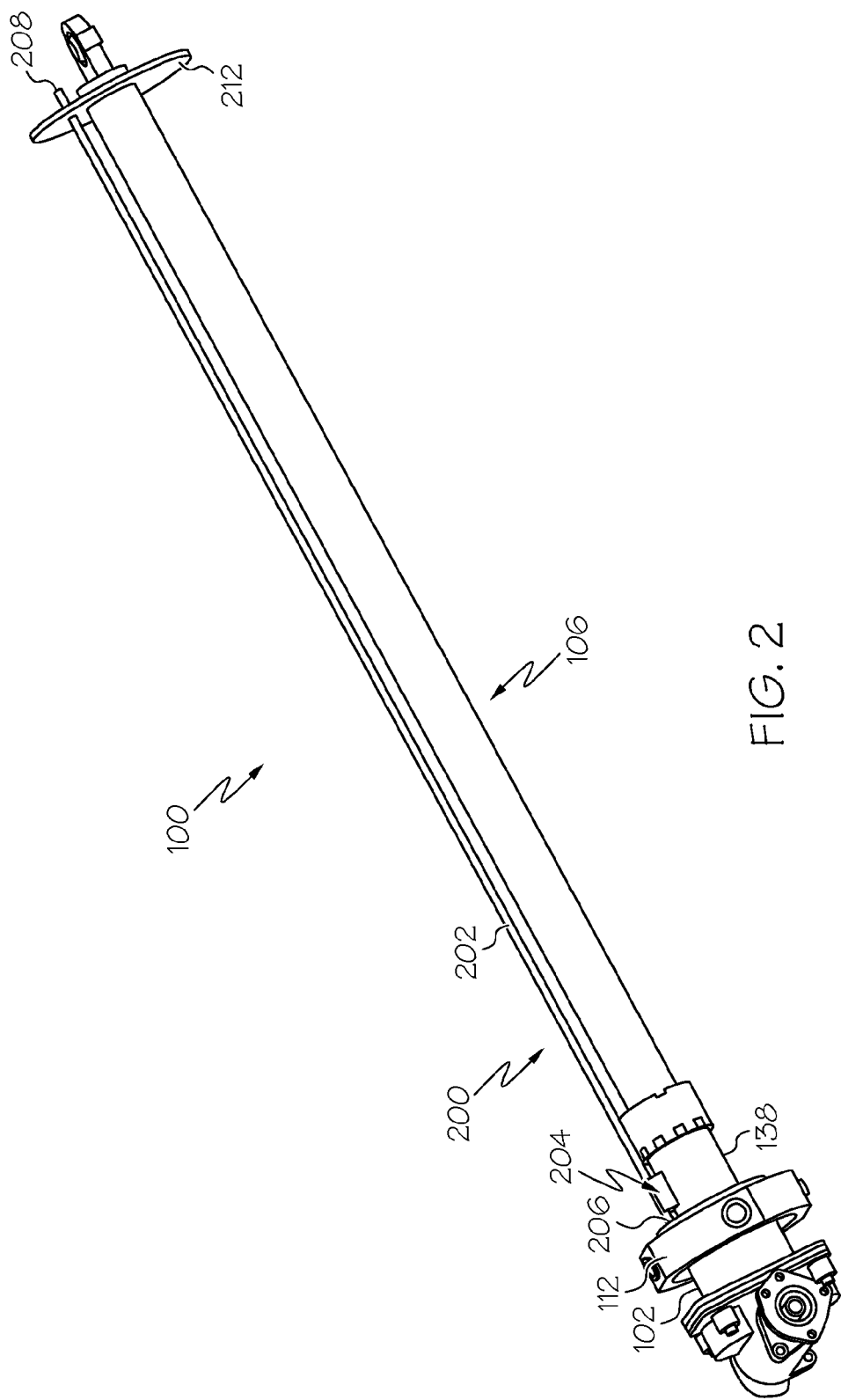

ACTUATOR INCLUDING HANDLING-PROOF POSITION FEEDBACK MECHANISM

CROSS-REFERENCE TO RELATED APPLICATION

This application is a divisional application of U.S. patent application Ser. No. 13/770,794, now U.S. Pat. No. 9,512,910.

TECHNICAL FIELD

The present invention generally relates to actuators, and more particularly relates to actuators that include a handling-proof position feedback mechanism.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various devices or components, such as control surfaces. Many different types of actuator configurations presently exist. One particular type of actuator is a linear electromechanical actuator (EMA). A typical linear EMA includes a power drive unit, an actuator shaft, and an actuation member. The power drive unit, such as a motor, is configured to supply a drive torque to the actuator shaft, via a drive shaft and, in many instances, suitable gearing. The actuator shaft, upon receipt of the drive torque, rotates, which in turn causes the actuation member to translate.

In many instances, the position of the device or component being moved by a linear EMA is sensed using a position sensor coupled to the EMA. The position sensor is typically implemented using a resolver, an RVDT (rotary variable differential transformer), or an LVDT (linear variable differential transformer). For system accuracy reasons, the position sensor is typically connected, during production, to one end of the actuator drive shaft. The position sensor "zero" (or reference) position setting is then set. Unfortunately, user handling of the post-production EMA can result in the "zero" position setting being lost. This in turn can lead to the need to implement undesirable post-installation rigging to ensure that the position sensor does not show an incorrect position due to actuator shaft-to-position sensor error.

Hence, there is need for an EMA that will not readily lose its "zero" position setting during post-production handling, shipping, and installation. The present invention addresses at least this need.

BRIEF SUMMARY

In one embodiment, an actuator includes a housing assembly, an actuator shaft, an actuation member, and an anti-rotation rod. The actuator shaft is rotationally mounted in the housing assembly, is adapted to receive a drive torque, and is configured, upon receipt of the drive torque, to rotate. The actuation member is mounted on the actuator shaft, and is configured to translate in response to rotation of the actuator shaft. The anti-rotation rod is coupled to the actuator housing and extends therefrom. The anti-rotation is rod configured to at least selectively engage, and thereby prevent rotation of, the actuation member.

In another embodiment, an actuator includes a housing assembly, an actuator shaft, an actuation member, a rod engagement structure, and an anti-rotation rod. The actuator shaft is rotationally mounted in the housing assembly, is adapted to receive a drive torque, and is configured, upon receipt of the drive torque, to rotate. The actuation member is mounted on the actuator shaft, and is configured to translate in response to rotation of the actuator shaft. The rod engagement structure extends from the actuation member and is translatable therewith. The rod engagement structure includes a first arm and a second arm. The first arm and the second arm are spaced apart from each other to define a rod passageway. The anti-rotation rod is coupled to the actuator housing and extends therefrom through the rod passageway. The anti-rotation rod is configured to at least selectively engage the rod engagement structure, to thereby prevent rotation of the actuation member.

In yet another embodiment, an actuator includes a housing assembly, a ball screw, a ball nut, a rod engagement structure, and an anti-rotation rod. The ball screw is rotationally mounted in the housing assembly, is adapted to receive a drive torque, and is configured, upon receipt of the drive torque, to rotate. The ball nut is mounted on the actuator shaft, and is configured to translate in response to rotation of the actuator shaft. The rod engagement structure extends from the ball nut and is translatable therewith. The anti-rotation rod is coupled to the actuator housing and extends therefrom. The anti-rotation rod is configured to at least selectively engage the rod engagement structure, and thereby prevent rotation of the ball nut.

Furthermore, other desirable features and characteristics of the actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 2 depicts a plan view of the EMA depicted in FIG. 1,

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
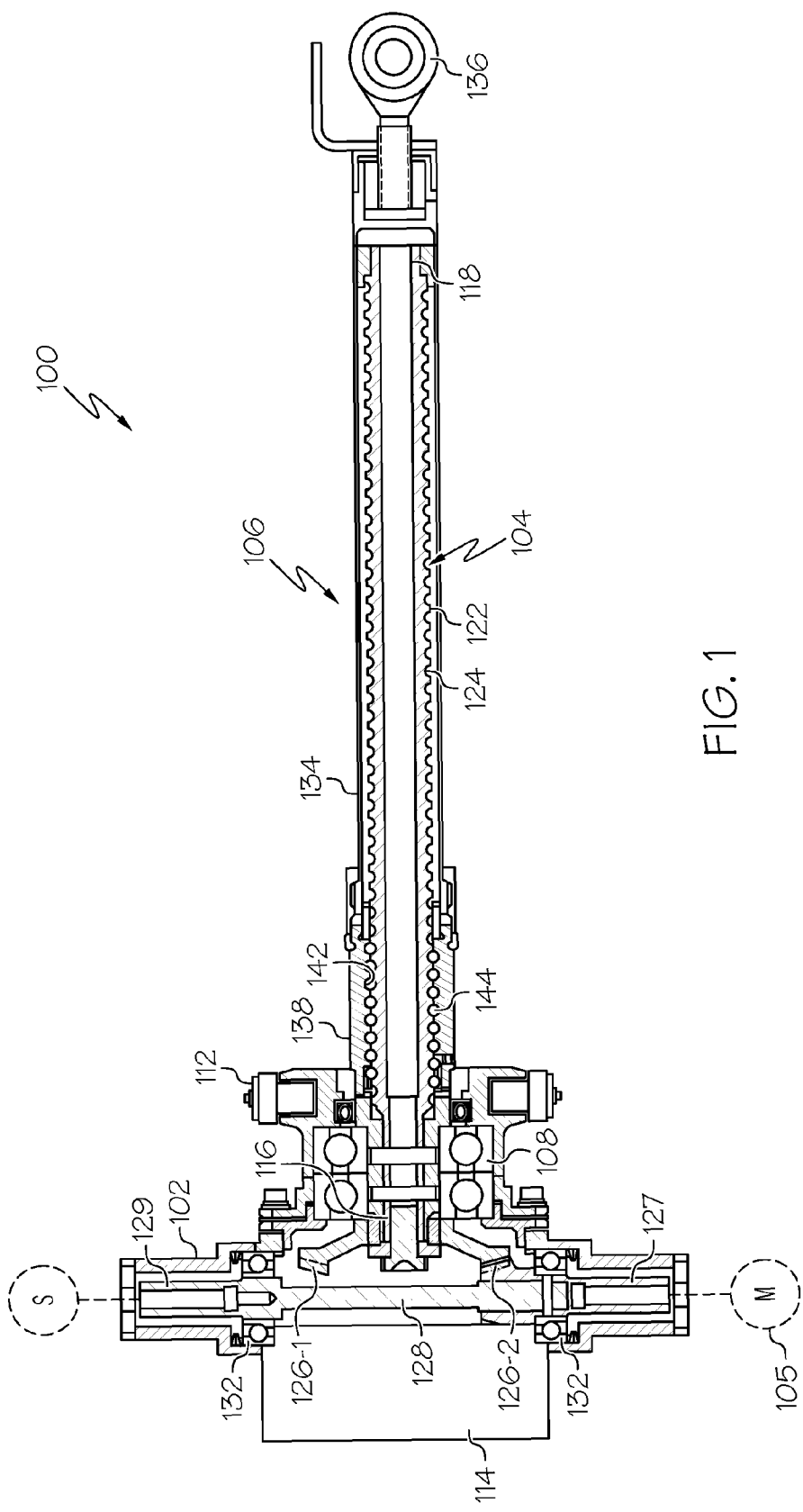
FIG. 1 depicts a cross section view of one embodiment of an electromechanical actuator (EMA)

Referring first to FIG. 1, a cross section view of an exemplary actuator is depicted, and includes a housing assembly 102, an actuator shaft 104, and an actuation member 106. The actuator shaft 104 extends through the housing assembly 102, and is rotationally mounted therein via a duplex bearing assembly 108. The housing assembly 102 is configured to be connected, via a gimbal mount 112, to a stationary support structure, such as the forward end of an engine nacelle support (not illustrated). The depicted actuator assembly 100 also includes an optional lock assembly 114, which is coupled to the actuator housing 102.

The actuator shaft 104 is adapted to receive a drive torque from a drive source 105 (shown in phantom in FIG. 1), such as a motor, and is configured, upon receipt of the drive torque, to rotate. It will be appreciated that the motor could be electric, hydraulic (including fuel), or pneumatic. Moreover, the drive source need not be implemented as a motor, but could be any one of numerous electric, hydraulic (including fuel), or pneumatic sources of drive torque. It will additionally be appreciated that the actuator shaft 104 may be variously configured and implemented, but in the depicted embodiment it is implemented as a ball screw shaft that includes a first end 116, a second end 118, and an outer surface 122. The outer surface 122 has a single or a plurality of ball grooves (or "threads") 124 formed thereon. The first end 116 of the actuator shaft 104, at least in the depicted embodiment, is coupled to a first bevel gear 126-1, which mates with a second bevel gear 126-2. The second bevel gear 126-2 is coupled to a drive shaft 128, which is rotationally mounted in the housing assembly 102 via suitable bearing assemblies 132. The drive shaft 128 is adapted to receive a drive torque from the drive source 105, and transfer the drive torque, via the first and second bevel gears 126-1, 126-2, to the actuator shaft 104, causing the actuator shaft 104 to rotate.

The actuation member 106 is mounted on the actuator shaft 104, and is configured to translate in response to the rotation of the actuator shaft 104. The actuation member 106 may also be variously configured and implemented, but in the depicted embodiment it includes an extension tube 134, a rod end assembly 136, and a ball nut 138. The extension tube 134 is coupled to, or is integrally formed with, the rod end assembly 136, which is configured to be coupled to a movable structure, such as a non-illustrated engine transcowl. The extension tube 134 is also coupled to, or integrally formed with, the ball nut 138. The ball nut 138 has a plurality of helical ball grooves (or "threads") 142 formed thereon. A plurality of recirculating balls 144 are disposed within the ball nut ball grooves 142, and in selected ones of the ball screw ball grooves 124. The balls 144, in combination with the ball grooves 124, 142, convert the rotational movement of the actuator shaft 104 into translational movement of the actuation member 106. It will be appreciated that the direction in which the actuation member 106 travels will depend on the direction in which the actuator shaft 104 rotates.

Before proceeding further, it was previously noted that the drive shaft 128 is adapted to receive a drive torque from the drive source 105. It will be appreciated that the drive shaft 128, which includes two ends—a first end 127 and a second end 129—may receive the drive torque at either of its ends 127 (129). Moreover, the other end 129 (127) is preferably coupled to a position sensor (also shown in phantom), which is used to provide position feedback of the movable component or device to which the actuator assembly 100 is connected. The position sensor may be variously configured and implemented, and may be, for example, a rotary variable differential transformer (RVDT), a linear variable differential transformer (LVDT), or a resolver, just to name a few.

Figure 4:
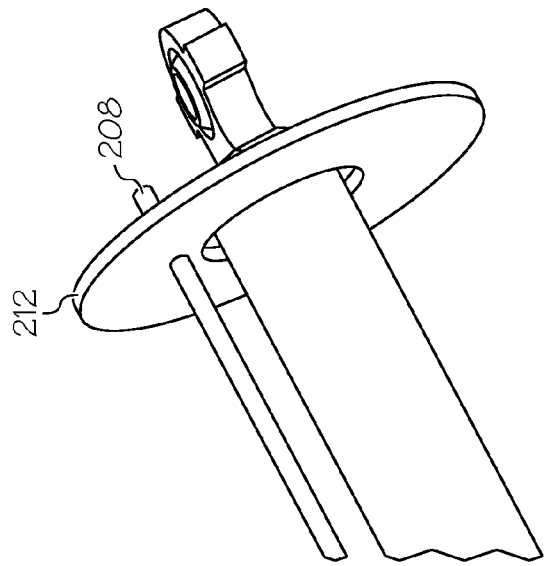
FIGS. 3 and 4 depict a close-up views of different portions of the EMA depicted in FIG. 2.

No matter the specific implementation and configuration of the position sensor, it is preferable, as noted above, that the extension tube 106 be prevented from rotating when the actuator 100 is being installed, so that the position sensor "zero" position is not lost. To provide this functionality, the actuator 100 includes a handling-proof position feedback mechanism. An embodiment of this mechanism is depicted in FIGS. 2-4, and will now be described.

With reference first to FIG. 2, it may be seen that the handling-proof position feedback mechanism 200 includes an anti-rotation rod 202. The anti-rotation rod 202 is coupled to the actuator housing 102 and extends therefrom. The anti-rotation rod 202 is configured to at least selectively engage the extension tube 106, and thereby prevent rotation thereof. More particularly, and as FIG. 2 also depicts, a rod engagement structure 204 extends from the actuation member 106 and is translatable therewith. The rod engagement structure 204 is configured to at least selectively engage the anti-rotation rod 202. As may be appreciated, when the rod engagement structure 204 does engage the anti-rotation rod 202, rotation of the actuation member 106 is prevented.

Figure 3:
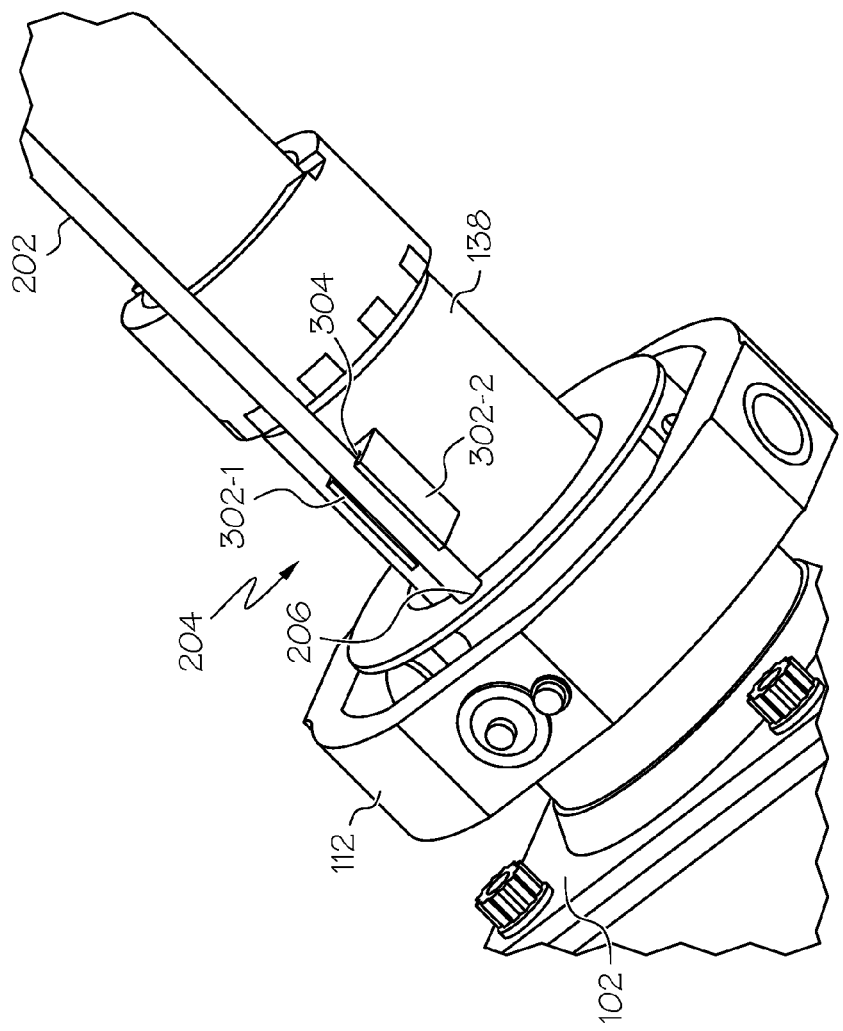

As shown most clearly in FIG. 3, in the depicted embodiment the rod engagement structure 204 is integrally formed on, or is coupled to, the ball nut 138. The rod engagement structure 204 may be variously configured, but in the depicted embodiment it is configured as a saddle structure that includes two arms 302 (e.g., 302-1, 302-2) that are spaced apart to form a rod passageway 304. The spacing between the arms 302 is sufficient to allow the anti-rotation rod 202 to extend through the passageway 304, and to provide adequate clearance so that the engagement structure 204 does not engage the anti-rotation rod 202 during normal operation of the actuator 100. However, as may be appreciated, the spacing is also sufficiently small so that the rod engagement structure 204 will engage the anti-rotation rod 202 during, for example, installation, maintenance, repair, and/or replacement operations.

Not only may the engagement structure 204 being variously configured and implemented, the anti-rotation rod 202 may also be variously configured and implemented. In the depicted embodiment, and with reference to FIGS. 2-4, the anti-rotation rod 202 includes a first end 206 that is coupled to the actuator housing 102, and a second end 208 that is adapted to be coupled to a fixed structure 212. The anti-rotation rod 202 may be fixedly coupled to either or both of the actuator housing 102 and fixed structure 212, or it may be removably coupled to either or both the actuator housing 102 and fixed structure 212. For embodiments in which the anti-rotation rod 202 is removably coupled to both the actuator housing 102 and fixed structure 212, the anti-rotation rod 202 may, if needed or desired, be removed after the actuator 100 is installed.

Figure 5:
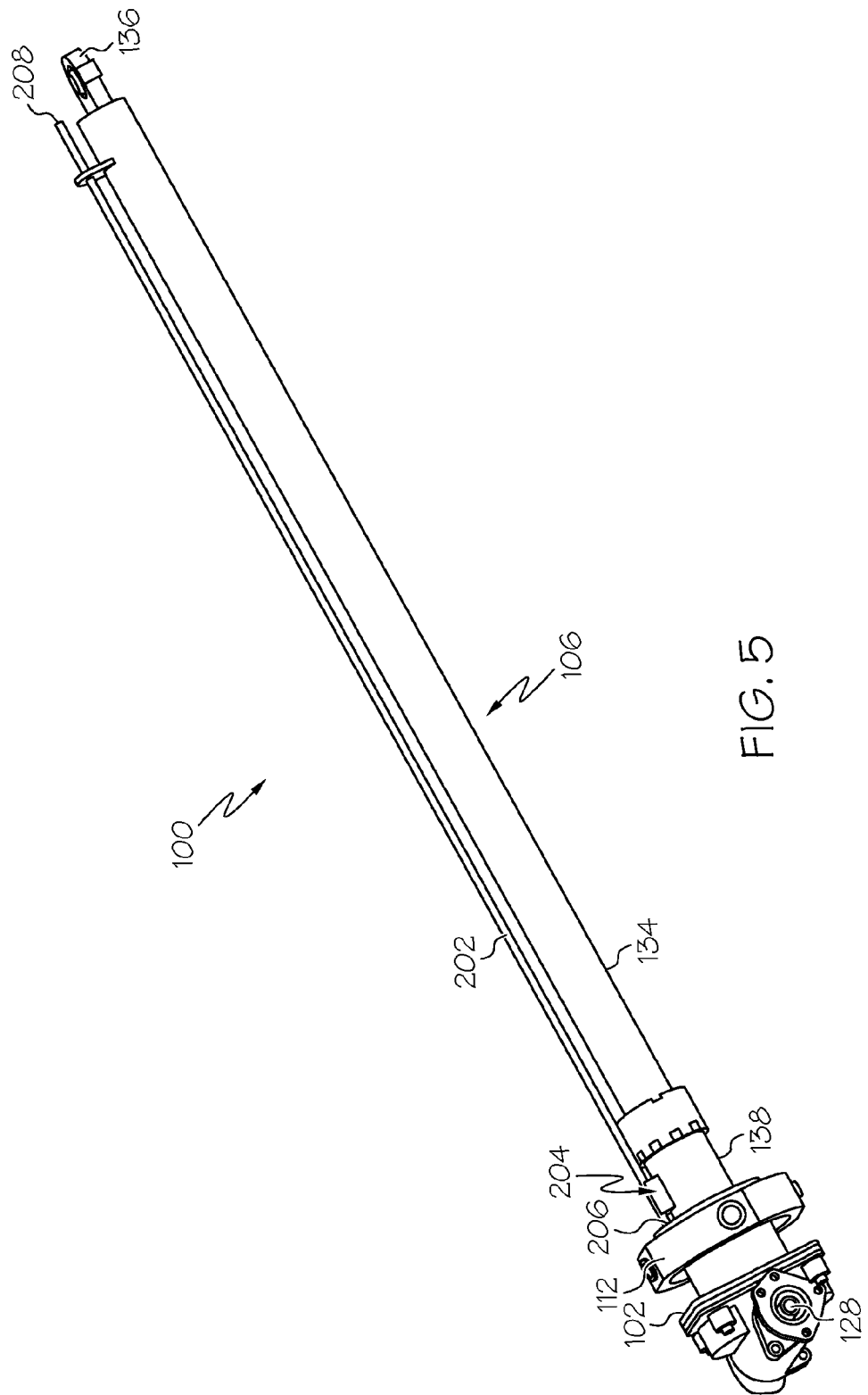
FIG. 5 depicts a plan view of another embodiment of an EMA.

In other embodiments, such as the one depicted in FIG. 5, the first end 206 of the anti-rotation rod 202 is again coupled to the actuator housing 102 (either fixedly or removably), but the second end 208 is coupled to the actuation member 106. As may be appreciated, with such embodiments, the anti-rotation rod 202 may be configured, as needed or desired, as a telescoping rod. In some embodiments, the anti-rotation rod 202 may extend in cantilever manner from the housing assembly 102.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator, comprising:
a housing assembly;
an actuator shaft rotationally mounted in the housing assembly, the actuator shaft adapted to receive a drive torque and configured, upon receipt thereof, to rotate;
an actuation member mounted on the actuator shaft, the actuation member configured to translate in response to rotation of the actuator shaft;
a rod engagement structure extending from the actuation member and translatable therewith; and
an anti-rotation rod connected to the housing assembly and extending therefrom, the anti-rotation rod configured to only selectively and non-continuously engage the rod engagement structure,
wherein:
the anti-rotation rod includes a first end and a second end;
the first end is coupled to the actuator housing;
the second end is adapted to be coupled to a fixed structure; and
rotation of the actuation member is prevented when the anti-rotation rod engages the rod engagement structure.

2. The actuator of claim 1, wherein:
the actuator shaft comprises a ball screw; and
the actuation member comprises a ball nut.

3. The actuator of claim 1, wherein:
the rod engagement structure comprises a first arm and a second arm, the first arm and the second arm spaced apart from each other to define a rod passageway; and
the anti-rotation rod extends through the rod passageway.

4. The actuator of claim 1, wherein the anti-rotation rod is removably coupled to the actuator housing.

5. An actuator, comprising:
a housing assembly;
an actuator shaft rotationally mounted in the housing assembly, the actuator shaft adapted to receive a drive torque and configured, upon receipt thereof, to rotate;
an actuation member mounted on the actuator shaft, the actuation member configured to translate in response to rotation of the actuator shaft;
a rod engagement structure extending from the actuation member and translatable therewith, the rod engagement structure including a first arm and a second arm, the first arm and the second arm spaced apart from each other to define a rod passageway; and
an anti-rotation rod connected to the housing assembly and extending therefrom through the rod passageway, the anti-rotation rod configured to only selectively and non-continuously engage the rod engagement structure, to thereby prevent rotation of the actuation member,
wherein:
the anti-rotation rod includes a first end and a second end;
the first end is coupled to the actuator housing;
the second end is adapted to be coupled to a fixed structure; and
rotation of the actuation member is prevented when the anti-rotation rod engages the rod engagement structure.

6. The actuator of claim 5, wherein:
the actuator shaft comprises a ball screw; and
the actuation member comprises a ball nut.

7. The actuator of claim 5, wherein the anti-rotation rod is removably coupled to the actuator housing.

8. An actuator, comprising:
a housing assembly;
a ball screw rotationally mounted in the housing assembly, the ball screw adapted to receive a drive torque and configured, upon receipt thereof, to rotate;
a ball nut mounted on the actuator shaft, the ball nut configured to translate in response to rotation of the actuator shaft;
an extension tube connected to the ball nut and translatable therewith;
a rod engagement structure extending from the ball nut and translatable therewith; and
an anti-rotation rod connected to the housing assembly and extending therefrom, the anti-rotation rod configured to only selectively and non-continuously engage the rod engagement structure, and thereby prevent rotation of the ball nut,
wherein:
the anti-rotation rod includes a first end and a second end;
the first end is coupled to the actuator housing;
the second end is adapted to be coupled to a fixed structure; and
rotation of the actuation member is prevented when the anti-rotation rod engages the rod engagement structure.

9. The actuator of claim 8, wherein:
the rod engagement structure comprises a first arm and a second arm, the first arm and the second arm spaced apart from each other to define a rod passageway; and
the anti-rotation rod extends through the rod passageway.

10. The actuator of claim 8, wherein the anti-rotation rod is removably coupled to the actuator housing.

* * * * *